(12) United States Patent
Kondo et al.

(10) Patent No.: US 11,904,574 B2
(45) Date of Patent: Feb. 20, 2024

(54) SCRATCH RESISTANT FILM AND SURFACE COATING COMPOSITION

(71) Applicant: 3M INNOVATIVE PROPERTIES COMPANY, St. Paul, MN (US)

(72) Inventors: Shinsuke Kondo, Yamagata (JP); Naota Sugiyama, Tokyo (JP); Yoshihiko Takeda, Miyagi (JP); Tatsuya Sato, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

(21) Appl. No.: 16/962,275

(22) PCT Filed: Jan. 15, 2019

(86) PCT No.: PCT/IB2019/050320
§ 371 (c)(1),
(2) Date: Jul. 15, 2020

(87) PCT Pub. No.: WO2019/138397
PCT Pub. Date: Jul. 18, 2019

(65) Prior Publication Data
US 2021/0061968 A1    Mar. 4, 2021

(30) Foreign Application Priority Data
Jan. 15, 2018 (JP) ................. 2018-004034

(51) Int. Cl.
*B32B 23/08*    (2006.01)
*C08J 7/043*    (2020.01)
(Continued)

(52) U.S. Cl.
CPC ............ *B32B 23/08* (2013.01); *B32B 27/304* (2013.01); *B32B 27/306* (2013.01);
(Continued)

(58) Field of Classification Search
None
See application file for complete search history.

(56) References Cited

U.S. PATENT DOCUMENTS 2,987,103 A  *  6/1961  Yakubik .................. B32B 27/00
                                                      428/203
6,404,548 B1 *  6/2002  Tatsuki .................. G03B 21/60
                                                      359/452
(Continued)

FOREIGN PATENT DOCUMENTS

JP         11-227116           8/1999
JP         2001/335752    * 12/2001  ............. B32B 27/10
(Continued)

OTHER PUBLICATIONS

Russell—PVC under stress—Ind. Eng.Chem.—1940 (Year: 1940).*
(Continued)

*Primary Examiner* — John Vincent Lawler

(57) ABSTRACT

Object: The present disclosure provides a film having a low gloss appearance and excellent scratch resistance, and a surface coating composition that can be used in the production of such a film. Resolution Means: The film of one embodiment of the present disclosure includes a scratch resistant surface layer containing a binder containing a urethane resin, urethane resin beads having an average particle diameter of 3 μm to 30 μm, hard particles having an average particle diameter of 5 μm to 45 μm; and nanosilica particles. The surface layer contains the hard particles in an amount of 30 parts by mass to 500 parts by mass per 100 parts by mass of the binder. The gloss of the surface layer is approximately 5.5 GU or less at 60 degrees.

18 Claims, 1 Drawing Sheet

(51) Int. Cl.
    *C08J 7/046*            (2020.01)
    *C08J 7/04*             (2020.01)
    *B32B 27/30*            (2006.01)
    *B32B 27/32*            (2006.01)
    *B32B 27/36*            (2006.01)
    *B32B 27/40*            (2006.01)
    *C08J 5/18*             (2006.01)
    *C08K 3/22*             (2006.01)
    *C08K 3/36*             (2006.01)

(52) U.S. Cl.
    CPC ............ *B32B 27/308* (2013.01); *B32B 27/32* (2013.01); *B32B 27/36* (2013.01); *B32B 27/40* (2013.01); *C08J 5/18* (2013.01); *C08J 7/043* (2020.01); *C08J 7/046* (2020.01); *C08J 7/0427* (2020.01); *C08K 3/22* (2013.01); *C08K 3/36* (2013.01); *B32B 2255/20* (2013.01); *B32B 2255/26* (2013.01); *B32B 2307/406* (2013.01); *B32B 2307/4023* (2013.01); *B32B 2307/412* (2013.01); *C08J 2475/04* (2013.01); *C08K 2003/2227* (2013.01); *C08K 2201/003* (2013.01); *C08K 2201/011* (2013.01)

(56) References Cited

U.S. PATENT DOCUMENTS

| | | | | |
|---|---|---|---|---|
| 8,187,695 | B2 | 5/2012 | Iizuka | |
| 2004/0052079 | A1* | 3/2004 | Nakano | G02B 5/0808 |
| | | | | 362/343 |
| 2005/0030630 | A1* | 2/2005 | Ohnishi | C08J 7/046 |
| | | | | 359/599 |
| 2008/0220224 | A1* | 9/2008 | Tokumoto | B32B 7/12 |
| | | | | 428/195.1 |
| 2009/0246439 | A1 | 10/2009 | Kanno | |
| 2010/0159772 | A1* | 6/2010 | Ashida | D06N 3/141 |
| | | | | 442/374 |
| 2011/0023945 | A1* | 2/2011 | Hayashi | C09D 127/08 |
| | | | | 136/251 |
| 2013/0041091 | A1* | 2/2013 | Brinkhuis | C08K 5/098 |
| | | | | 524/513 |
| 2014/0255669 | A1* | 9/2014 | Akou | B32B 27/283 |
| | | | | 428/203 |
| 2016/0024330 | A1* | 1/2016 | Jung | C08J 7/046 |
| | | | | 428/313.9 |
| 2016/0115340 | A1* | 4/2016 | Hashimoto | G02B 1/14 |
| | | | | 428/143 |
| 2016/0145465 | A1* | 5/2016 | Furutaka | C09D 11/00 |
| | | | | 428/205 |
| 2016/0200082 | A1* | 7/2016 | Awa | C08J 7/0423 |
| | | | | 428/336 |
| 2016/0318328 | A1* | 11/2016 | Satou | C04B 41/52 |

FOREIGN PATENT DOCUMENTS

| | | | | |
|---|---|---|---|---|
| JP | 2001-335752 | | 12/2001 | |
| JP | 2008-087158 | | 4/2008 | |
| JP | 2008/238602 | * | 10/2008 | ............ B32B 33/00 |
| JP | 2008-238602 | | 10/2008 | |
| JP | 4200807 | | 10/2008 | |
| JP | 2011-255552 | | 12/2011 | |
| JP | 2015101609 | * | 6/2015 | ............ B32B 27/16 |
| JP | 2017-159544 | | 9/2017 | |
| KR | 2015/0090061 | * | 8/2015 | ............ C08F 290/06 |
| WO | WO2009-145961 | | 12/2009 | |
| WO | WO 2014/081004 | | 5/2014 | |

OTHER PUBLICATIONS

Nomura—JP 2001-335752 A—ISR D2—MT—coating comp—2001 (Year: 2001).*
Kano—JP 2008-238602 A—ISR D1—MT—decorative sheet—2008 (Year: 2008).*
Fortaps—The great flexibility and resistance of polyethylene plastic—Oct. 20, 2021 (Year: 2021).*
Tsujimoto—JP 2015-101609 A—sister of IDS—Biblio+MT-GoogleSave—urethane acrylate w-urethane particles of amount & size—2015 (Year: 2015).*
Tsujimoto—KR 2015-0090061 A—sister Euro D1—OG—urethane acrylate w-urethane beads—2015 (Year: 2015).*
International Search Report for PCT International Application No. PCT/IB2019/050320, dated May 14, 2019, 4 pages.
Bauer et al, UV Curing and Matting of Acrylate Coatings Reinforced by Nano-Silica and Micro-Corundum Particles—Progress in Organic Coatings, Elsevier BV, NL, vol. 60, No. 2, Sep. 1, 2007, pp. 121-126, XP022284406, ISSN 0300-9440.
Haruehansapong Sattawat et al—Effect of 1-15 Nanosilica Particle Size on the Water Permeability, Abrasion Resistance, Drying Shrinkage, and Repair Work Properties of Cement Mortar Containing Nano-SiO 2—Advances in Materials Science and Engineering, vol. 2017, Jan. 2, 2017, pp. 1-11, XP055830630.

* cited by examiner

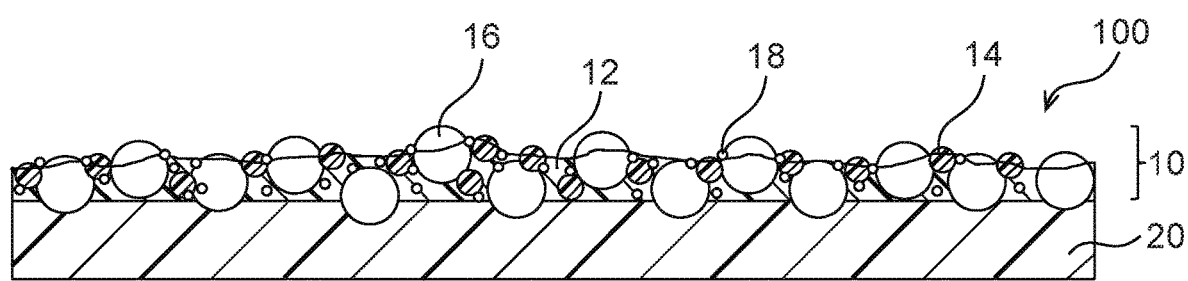

SCRATCH RESISTANT FILM AND SURFACE COATING COMPOSITION

CROSS REFERENCE TO RELATED APPLICATIONS

This application is a national stage filing under 35 U.S.C. 371 of PCT/IB2019/050320, filed Jan. 15, 2019, which claims the benefit of Japanese Application No. 2018-004034, filed Jan. 15, 2018, the disclosure of which is incorporated by reference in their entirety herein.

TECHNICAL FIELD

The present disclosure relates to a scratch resistant film that can be used for purposes such as decoration, and a surface coating composition that can be used in the production of such a film.

BACKGROUND ART

Decorative films have been used for the purposes of decoration of the interior and exterior of buildings, vehicles, and the like. For example, decorative films in which a polyvinyl chloride film having a printed layer and a transparent polyvinyl chloride film are laminated and which have been subjected to emboss finishing are known. Various material textures, such as woodgrain, metallic, textile, and marble textures, can be expressed by using various combinations of lamination and emboss finishing.

For example, Patent Document 1 (JP 2011-516299 T) describes "a decorative sheet comprising (i) a substrate layer, (ii) a scratch resistant layer including a transparent resin layer and hard particles dispersed in the transparent layer; wherein an average particle diameter of the hard particles is greater than a thickness of the transparent resin layer; an amount of the hard particles is from 30 to 400 parts by weight per 100 parts by weight of the transparent resin layer; and an area ratio of portions where the hard particles protrude by 3 micrometers or more from an external surface of the transparent resin layer is from 10% to 80% of the scratch resistant layer".

Patent Document 2 (U.S. Pat. No. 8,187,695 Specification) describes a molded sheet including, on a substrate, at least an ink layer provided over the entire surface, and a surface molded layer which is present on the ink layer and makes contact with the ink layer while covering the entire surface of the ink layer; wherein the surface molded layer is a crosslink-cured product of a curable resin composition; and a surface of the surface molded layer has an uneven shape.

CITATION LIST

Patent Literature

Patent Document 1: JP 2011-516299 T
Patent Document 2: U.S. Pat. No. 8,187,695 Specification

SUMMARY OF INVENTION

Technical Problem

In recent years, there has been a demand for films that have an appearance with less gloss and that can reproduce surfaces of dry-finished wood, matte coating, and the like. Known methods include forming a decorative film having a low gloss appearance by coating with a resin containing microparticles or beads to form a surface layer. These decorative films can be used for exterior or interior of buildings, interior of vehicles, furniture, decoration of articles, and the like. Decorative films are preferably scratch resistant so that the decorative properties are not diminished by friction or impact from another article during use in these applications.

However, decorative films having a low gloss appearance have unevenness caused by microparticles or beads, and the fine uneven surface is easily deformed or damaged due to scratching with fingernails, articles, or the like, for example, which often causes the low gloss to be lost. It is therefore very difficult to achieve both a low gloss appearance and scratch resistance in a decorative film.

The present disclosure relates to a film having a low gloss appearance and excellent scratch resistance, and a surface coating composition that can be used in the production of such a film.

Solution to Problem

One embodiment provides a scratch resistant film including a surface layer, the surface layer containing: a binder containing a urethane resin; urethane resin beads having an average particle diameter of 3 μm to 30 μm; hard particles having an average particle diameter of 5 μm to 45 μm; and nanosilica particles; wherein the surface layer contains from 30 parts by mass to 500 parts by mass of the hard particles based on 100 parts by mass of the binder; and the gloss of the surface layer is 5.5 GU or less at 60 degrees.

Another embodiment provides a surface coating composition including: a binder precursor containing a urethane resin composition; urethane resin beads having an average particle diameter of 3 μm to 30 μm; hard particles having an average particle diameter of 5 μm to 45 μm; and nanosilica particles; wherein the surface coating composition contains from 30 parts by mass to 500 parts by mass of the hard particles based on 100 parts by mass of the binder precursor.

Advantageous Effects of Invention

Because the film of the present disclosure has a low gloss appearance and excellent scratch resistance, the film can be suitably used for the interior or exterior of buildings, vehicles, or the like. Furthermore, surface layer which has low gloss and excellent scratch resistance can be formed on the surface of an article such as a film by using the surface coating composition of the present disclosure.

Note that the above descriptions should not be construed to be a disclosure of all of the embodiments and benefits of the present disclosure.

BRIEF DESCRIPTION OF DRAWINGS

FIG. 1 is a schematic cross-sectional view of a scratch resistant film according to an embodiment of the present disclosure.

DESCRIPTION OF EMBODIMENTS

Hereinafter, representative embodiments of the present disclosure will be described in more detail. However, the present disclosure is not limited to these embodiments.

In the present disclosure, "transparent" refers to a condition where the total light transmittance in the wavelength range of 400 to 700 nm of a material or article is approximately 85% or greater. "Translucent" refers to a condition where the total light transmittance in the wavelength range of 400 to 700 nm of a material or article is approximately 20% or greater but approximately less than 85%. "Opaque" refers to a condition where the total light transmittance in the wavelength range of 400 to 700 nm of a material or article is approximately less than 20%. The total light transmittance can be determined in accordance with JIS K 7361-1:1997 (ISO 13468-1:1996).

In an embodiment, the film has a scratch resistant surface layer containing a binder containing a urethane resin, urethane resin beads having an average particle diameter of approximately 3 μm to approximately 30 μm, hard particles having an average particle diameter of approximately 5 μm to approximately 45 μm; and nanosilica particles. The surface layer contains the hard particles in an amount of approximately 30 parts by mass to approximately 500 parts by mass per 100 parts by mass of the binder. The gloss of surface layer is not greater than approximately 5.5 GU at 60 degrees. A film with the surface layer containing urethane resin beads having an average particle diameter within the range described above, a prescribed amount of hard particles having an average particle diameter within the range described above, and nanosilica particles has a low gloss appearance and scratch resistance.

A schematic cross-sectional view of the film of the present disclosure is illustrated in FIG. 1. The film 100 of FIG. 1 has a surface layer 10 and a substrate layer 20 which is an optional component. The film 100 may also be formed from only the surface layer 10; that is, the surface layer 10 itself may be a film. The surface layer 10 contains a binder 12 containing a urethane resin, urethane resin beads 14, hard particles 16, and nanosilica particles 18.

The binder contains a urethane resin. Various publicly known urethane resins can be used as the urethane resin. The urethane resin can be obtained by drying or curing a urethane resin composition. The urethane resin composition may be an aqueous or non-aqueous system. It is advantageous that the urethane resin is a cured product of a two-part urethane resin composition. The two-part urethane resin composition is typically a non-aqueous urethane resin composition. Use of the two-part urethane resin composition forms a chemical bond between other components in the surface layer such as urethane resin beads, hard particles, and nanosilica particles, for example and the urethane resin during the formation of the surface layer, and such use can prevent or suppress shedding of these particles from the surface layer and/or bleeding out of the components.

The two-part urethane resin composition typically contains a polyol as a main agent and a multi-functional isocyanate as a curing agent and, as necessary, a catalyst and/or a solvent.

As the polyol, polyester polyols, such as polycaprolactone diol and polycaprolactone triol; polycarbonate polyols, such as cyclohexanedimethanol carbonate and 1,6-hexanediol carbonate; and combinations of these can be used. These polyols can impart transparency, weather resistance, strength, chemical resistance, and the like to the surface layer. In particular, the polycarbonate polyol can form a surface layer having high transparency and chemical resistance. From the perspective of imparting stretchability on the surface layer while excessive degree of crosslinked structure is not formed, the polyol is preferably a diol, and polyester diols and polycarbonate diols, especially polycarbonate diols, can be advantageously used.

The OH value of the polyol may be approximately 10 mg/KOH or greater, approximately 20 mg/KOH or greater, or approximately 30 mg/KOH or greater, but approximately 150 mg/KOH or less, approximately 130 mg/KOH or less, or approximately 120 mg/KOH or less.

Examples of the multi-functional isocyanate include aliphatic polyisocyanates, alicyclic polyisocyanates, aromatic polyisocyanates, and aromatic aliphatic polyisocyanates, and multimers (dimers, trimers, and the like), biuret-modified products, allophanate-modified products, polyol-modified products, oxadiazine trione-modified products, and carbodiimide-modified products of these polyisocyanates. From the perspective of imparting stretchability to the surface layer while excessive degree of crosslinked structure is not formed, the multi-functional isocyanate is preferably diisocyanate. Examples of such diisocyanate include aliphatic diisocyanates, such as tetramethylene diisocyanate and hexamethylene diisocyanate (HDI); alicyclic diisocyanates, such as isophorone diisocyanate, trans,trans- and trans,cis- and cis,cis-dicyclohexylmethane-4,4'-diisocyanate and mixtures of these (hydrogenated MDI); aromatic diisocyanates, such as 2,4-tolylene diisocyanate and 2,6-tolylene diisocyanate, and isomeric mixtures of these tolylene diisocyanate (TDI), 4,4'-diphenylmethane diisocyanate, 2,4'-diphenylmethane diisocyanate, 2,2'-diphenylmethane diisocyanate, and isomeric mixtures of these diphenylmethane diisocyanate (MDI); aromatic-aliphatic diisocyanates, such as 1,3- or 1,4-xylylene diisocyanate or mixtures thereof (XDI), and 1,3- or 1,4-tetramethylxylylene diisocyanate or mixtures thereof (TMXDI).

As the equivalent weight ratio of the polyol to the polyisocyanate, the equivalent weight of the polyisocyanate may be approximately 0.6 equivalents or greater, approximately 0.7 equivalents or greater, but approximately 2 equivalents or less, or approximately 1.2 equivalents or less, per 1 equivalent of the polyol.

As the catalyst, catalysts that are typically used in formation of urethane resins, such as di-n-butyltin dilaurate, zinc naphthenate, zinc octenoate, and triethylenediamine, can be used. The content of the catalyst is approximately 0.005 parts by mass or greater, or approximately 0.01 parts by mass or greater, but approximately 0.5 parts by mass or less, or approximately 0.2 parts by mass or less, per 100 parts by mass of the two-part urethane resin composition.

The binder may further contain a cellulose ester. Inclusion of a cellulose ester in the binder can increase the viscosity of the binder during the drying process and decrease the surface fluidity. As a result, a binder precursor containing the urethane resin beads, hard particles, and the like can be uniformly coated. Examples of the cellulose ester include cellulose acetate propionate and cellulose acetate butyrate.

The molecular weight of the cellulose ester may be approximately 12000 or greater, approximately 16000 or greater, or approximately 20000 or greater, but approximately 110000 or less, approximately 100000 or less, or approximately 90000 or less, taking the solubility in the solvent into consideration.

The glass transition temperature (Tg) of the cellulose ester may be approximately 85° C. or higher, approximately 96° C. or higher, or approximately 101° C. or higher, but approximately 190° C. or lower, approximately 180° C. or lower, or approximately 160° C. or lower, taking the capability of maintaining the shape at the used temperature into consideration.

In some embodiments, approximately 5 parts by mass or greater, approximately 10 parts by mass or greater, or approximately 15 parts by mass or greater, but approximately 35 parts by mass or less, approximately 30 parts by mass or less, or approximately 25 parts by mass or less, per 100 parts by mass of the binder, of the cellulose ester may be contained in the binder. The content of the cellulose ester within the range described above can impart a uniform, low gloss appearance and scratch resistance to the surface layer due to the uniform dispersion of the urethane resin beads and hard particles in the surface layer.

The surface layer of the present embodiment contains urethane resin beads. The urethane resin beads can form fine recesses and protrusions on the film surface due to the presence of the beads and can form a low gloss structure on the film surface. Furthermore, because the urethane resin beads have good affinity to the binder containing the urethane resin, the urethane resin beads exhibit high adhesion to the binder. As a result, shedding of the urethane resin beads from the binder can be suppressed in the case where the film is stretched or deformed.

As the urethane resin beads, crosslinked polyurethane microparticles obtained via suspension polymerization, seed polymerization, emulsion polymerization, or the like can be used. The urethane resin beads have excellent flexibility, toughness, scratch resistance, and the like, and these characteristics can be imparted to the surface layer.

The average particle diameter of the urethane resin beads is preferably approximately 3 μm or greater but approximately 30 μm or less. In some embodiments, the average particle diameter of the urethane resin beads may be approximately 5 μm or greater, or approximately 10 μm or greater, but approximately 25 μm or less, or approximately 20 μm or less. When the average particle diameter of the urethane resin beads is not less than approximately 3 μm, the whitening of the film surface due to the scattering of light can be suppressed. When the average particle diameter of the urethane resin beads is not greater than approximately 30 μm, gloss can be suppressed, and low gloss can be imparted to the surface layer. The urethane resin beads having the average particle diameter within the range described above can impart low lightness, i.e., low gloss with less whiteness, to the surface layer by appropriately scattering the incident light to the surface layer.

In some embodiments, the urethane resin beads may be contained in the surface layer in an amount of approximately 13 parts by mass or greater, approximately 15 parts by mass or greater, or approximately 20 parts by mass or greater, but approximately 120 parts by mass or less, approximately 110 parts by mass or less, or approximately 100 parts by mass or less, per 100 parts by mass of the binder. By setting the content of the urethane resin beads to not less than approximately 13 parts by mass, low gloss can be imparted to the surface layer, and whitening can be suppressed by setting the content to not greater than approximately 120 parts by mass. The content of the urethane resin beads within the range described above can provide a surface layer that exhibits low gloss in a wide visual angle, e.g. from 20 degrees to 85 degrees.

The surface layer of the present embodiment further contains hard particles. The hard particles impart scratch resistance to the surface layer.

Particles containing alumina, silica, chromium oxide, iron oxide, zirconium, titanium, or a mixture of at least two thereof may be used as hard particles. In one embodiment, the hard particles contain alumina. The shape of the hard particles may be, but is not limited to, a spherical shape, a plume shape, a prolate spheroid shape, a needle shape, a polyhedron shape, a cylindrical shape, or amorphous shape. Higher scratch resistance can be achieved by using spherical hard particles. In one embodiment, the hard particles contain alumina spherical particles (alumina beads).

The hardness of the hard particles may be 7 or greater or 9 or greater but 15 or less or 13 or less in terms of the modified Mohs hardness.

The average particle diameter of the hard particles is preferably from approximately 5 μm to approximately 45 μm. In some embodiments, the average particle diameter of the hard particles may be approximately 10 μm or greater, or approximately 15 μm or greater, but approximately 40 μm or less, or approximately 35 μm or less. By setting the average particle diameter of the hard particles to not less than approximately 5 μm, scratch resistance can be imparted to the surface layer. By setting the average particle diameter of the hard particles to not greater than approximately 45 μm, gloss caused by the hard particles can be suppressed, and low gloss can be imparted to the surface layer. The average particle diameter of the hard particles can be measured using a Multisizer (trade name) (Beckman Coulter, Koto-ku, Tokyo, Japan) precision particle size distribution measuring device employing the electrical sensing zone method.

In some embodiments, the ratio of the average particle diameter of the hard particles to the average particle diameter of the urethane resin beads (average particle diameter of the hard particles/average particle diameter of the urethane resin beads) may be not less than approximately 1, not less than approximately 1.2, or not less than approximately 1.4 and not greater than approximately 10, not greater than approximately 9, or not greater than approximately 8. By setting the average particle diameter of the hard particles to be equal to or greater than the average particle diameter of the urethane resin beads, any external force applied to the surface layer by fingernails, articles, or the like preferentially acts on the hard particles over the urethane resin beads, so the scratch resistance of the surface layer can be increased, and the low gloss of the surface layer can be maintained by suppressing the shedding of the urethane resin beads.

In one embodiment, the average particle diameter of the hard particles is not less than the minimum thickness of the surface layer. In this embodiment, the scratch resistance of the surface layer can be increased further by increasing the number of hard particles protruding from the surface layer. In some embodiments, the average particle diameter of the hard particles may be set to not less than approximately 1.1 times, not less than approximately 1.2 times, or not less than approximately 1.3 times and not more than approximately 2 times, not more than approximately 1.8 times, or not more than approximately 1.7 times the minimum thickness of the surface layer. By setting the average particle diameter of the hard particles to not less than approximately 1.1 times the minimum thickness of the surface layer, the number of hard particles protruding from the surface layer can be increased and the scratch resistance of the surface layer can be increased further, and by setting the average particle diameter of the hard particles to not more than approximately 2 times the minimum thickness of the surface layer, the shedding of hard particles from the surface layer can be suppressed effectively.

The hard particles are preferably contained in the surface layer in an amount of approximately 30 parts by mass to approximately 500 parts by mass per 100 parts by mass of the binder. In some embodiments, the hard particles may be contained in the surface layer in an amount of not less than approximately 30 parts by mass, not less than approximately 50 parts by mass, or not less than approximately 70 not less than approximately and not greater than approximately 500 parts by mass, not greater than approximately 400 parts by mass, or not greater than approximately 300 parts by mass per 100 parts by mass of the binder. By setting the content of the hard particles to not less than approximately 30 parts by mass, high scratch resistance can be imparted to the surface layer. By setting the content of the hard particles to not greater than approximately 500 parts by mass, excessive increases in the haze value of the surface layer caused by the hard particles can be suppressed. By suppressing excessive increases in the haze value of the surface layer, decorations such as color, printing, or patterns can be made clearly visible through the surface layer in a film having such decorations underneath the surface layer. By setting the content of the hard particles to not greater than approximately 400 parts by mass, the low gloss appearance can be maintained even when the film is stretched, and increases in lightness—that is, whitening—can be prevented or suppressed during 150% stretching, for example.

In some embodiments, the mass ratio of the hard particles to the urethane resin beads (content (parts by mass) of the hard particles/content (parts by mass) of the urethane resin beads) may be not less than approximately 0.5, not less than approximately 1.5, or not less than approximately 3 and not greater than approximately 10, not greater than approximately 9, or not greater than approximately 8. Setting the mass ratio of the hard particles and the urethane resin beads to within the range described above contributes to the provision of a low gloss appearance and scratch resistance.

In some embodiments, the total content of hard particles and urethane resin beads may be not less than approximately 40 parts by mass, not less than approximately 60 parts by mass, or not less than approximately 70 parts by mass and not greater than approximately 500 parts by mass, not greater than approximately 400 parts by mass, or not greater than approximately 300 parts by mass per 100 parts by mass of the binder. Setting the total content of hard particles and urethane resin beads to within the range described above contributes to the provision of a low gloss appearance and scratch resistance.

The surface layer of the present embodiment further contains nanosilica particles. The presence of the nanosilica particles in the binder suppresses change in low gloss, which tends to be caused when the film is stretched in the case where only the urethane resin beads are used, and thus can effectively prevent whitening of the film. The nanosilica particles also contribute to the suppression of the shedding of hard particles.

In the case of nanosilica particles, for example, a silica sol obtained using liquid glass (sodium silicate solution) as a starting material can be used. The surface of the nanosilica particles may be modified using a surface treatment agent, such as silane, alcohol, amine, carboxylic acid, sulfonic acid, phosphonic acid, and titanate.

In some embodiments, the average particle diameter of the nanosilica particles is approximately 10 nm or greater, approximately 20 nm or greater, or approximately 30 nm or greater, but approximately 100 nm or less, approximately 75 nm or less, or approximately 45 nm or less. As described above, using the nanosilica particles having extremely small size, the nanosilica particles can be highly dispersed in the surface layer. Even when the film is stretched, because the fine nanosilica particles are dispersed and remain in the stretched part, loss of low gloss can be suppressed and whitening of the film can be effectively prevented. The nanosilica particles that are present adjacent to the urethane resin beads or the hard particles may function as a sort of physical crosslinking point between the urethane resin beads or the hard particles and the binder. The presence of the nanosilica particles that may function as such physical crosslinking points suppresses shedding of the urethane beads and the hard particles when the film is stretched, and can maintain the scratch resistance of the film and effectively prevent whitening of the film.

In some embodiments, the nanosilica particles may be contained in the surface layer in an amount of not less than approximately 30 parts by mass, not less than approximately 35 parts by mass, or not less than approximately 40 parts by mass and not greater than approximately 500 parts by mass, not greater than approximately 300 parts by mass, or not greater than approximately 250 parts by mass per 100 parts by mass of the binder. By setting the content of the nanosilica particles to within the range described above, excellent scratch resistance can be imparted to the surface layer. By setting the content of the nanosilica particles to not more than approximately 300 parts by mass, the low gloss appearance can be maintained even when the film is stretched, and increases in lightness—that is, whitening—can be prevented or suppressed during 150% stretching, for example.

The surface layer further contains a silicone-modified polymer having a functional group capable of reacting with isocyanates or a hydroxy group. When finger sebum is attached on the surface with low gloss, the trace thereof is easily visually observed. The fingerprint resistance of the surface layer can be enhanced by allowing the silicone-modified polymer having a functional group capable of reacting with isocyanates or a hydroxy group to be contained in the surface layer. The silicone-modified polymer can impart scratch resistance, due to smoothness, to the surface layer by reducing the friction coefficient of the surface layer. The isocyanate or hydroxy group of the silicone-modified polymer may be reacted with the hydroxy group or isocyanate group of the urethane resin in the binder or urethane resin beads, and the silicone-modified polymer may be bonded to the urethane resin or the urethane resin beads. In this embodiment, bleeding out from the surface layer of the silicone-modified polymer can be prevented or suppressed.

As the silicone-modified polymer having a functional group capable of reacting with isocyanates or a hydroxy group, a polyether-modified silicone, polyester-modified silicone, aralkyl-modified silicone, acryl-modified silicone, and silicone-modified polymer, such as a silicone-modified polyacrylate and urethane-modified silicone, can be used. Examples of the functional group capable of reacting with isocyanates or a hydroxy group of the silicone-modified polymer include a hydroxyl group, an amino group having active hydrogen, an isocyanate group, an epoxy group, and an acid anhydride group. From the perspective of achieving especially excellent fingerprint resistance, the silicone-modified polymer is advantageously a silicone-modified polyacrylate. The silicone-modified polymer preferably has a hydroxy group or an isocyanate group having high reactivity with an isocyanate or hydroxy group, and particularly preferably has a hydroxy group.

In some embodiments, the silicone-modified polymer having a functional group capable of reacting with isocyanates or a hydroxy group, e.g. a silicone-modified polyacrylate, may be contained in an amount of approximately 0.1 parts by mass or greater, approximately 1 parts by mass or greater, or approximately 3 part by mass or greater, but approximately 35 parts by mass or less, approximately 25 parts by mass or less, or approximately 20 parts by mass or less, per 100 parts by mass of the binder, in the surface layer. By setting the content of the silicon-modified polymer to within the range described above, the fingerprint resistance and/or scratch resistance of the surface layer can be further enhanced.

As other optional component(s), the surface layer may contain additive(s) such as fillers other than the urethane resin beads, the hard particles, and the nanosilica particles, UV absorbents, photostabilizers, thermal stabilizers, dispersants, plasticizers, flow enhancing agents, and leveling agents. Each and the total contents of these additives can be decided in the range that does not impair the characteristics required for the surface layer.

In one embodiment, the surface layer can be formed using a surface coating composition containing a binder precursor containing the urethane resin composition described above, urethane resin beads having an average particle diameter of 3 µm to 30 µm, hard particles having an average particle diameter of 5 µm to 45 µm, and nanosilica particles.

The binder precursor may contain the cellulose ester described above for the binder, in addition to the urethane resin composition. The cellulose ester can impart quick-drying properties, dry feeling when touched by a finger, flowability, leveling properties, or the like to the surface coating composition. The cellulose ester can be used for adjusting viscosity of the surface coating composition.

The surface coating composition may further contain a silicone-modified polymer having a functional group capable of reacting with isocyanates or a hydroxy group described above. The isocyanate or hydroxy group of the silicone-modified polymer can be reacted with the hydroxy group or isocyanate group of the urethane resin composition or urethane resin beads to bond the silicone-modified polymer with the urethane resin or the urethane resin beads. This can prevent or suppress bleeding out from the surface layer of the silicone-modified polymer. When the silicone-modified polymer is used, from the perspective of reactivity, it is advantageous that the urethane resin composition contains a two-part urethane resin composition.

The composition of the surface coating composition is as described for the surface layer. The same applies to contents of the cellulose ester, urethane resin beads, hard particles, nanosilica particles, and silicone-modified polymer having a functional group capable of reacting with isocyanates or a hydroxy group except for changing "100 parts by mass of the binder" as a reference to "100 parts by mass of the binder precursor".

To enhance workability, coatability, and the like, the surface coating composition may further contain a solvent, such as aromatic hydrocarbons of ketones, such as methyl ethyl ketone, methyl isobutyl ketone, and acetyl acetone, toluenes, xylenes, and the like; alcohols, such as ethanol and isopropyl alcohol; esters, such as ethyl acetate and butyl acetate; and ethers, such as tetrahydrofuran, propylene glycol monomethyl ether, propylene glycol monomethyl ether acetate (1-methoxy-2-propyl acetate), and dipropylene glycol monomethyl ether acetate. The content of the solvent in the surface coating composition is typically not less than approximately 10 parts by mass, not less than approximately 20 parts by mass, or not less than approximately 50 parts by mass and not greater than approximately 800 parts by mass, not greater than approximately 500 parts by mass, or not greater than approximately 300 parts by mass per 100 parts by mass of the binder precursor.

The viscosity of the surface coating composition is typically approximately 20 mPa·s or greater, approximately 50 mPa·s or greater, or approximately 100 mPa·s or greater, but approximately 1000 mPa·s or less, approximately 800 mPa·s or less, or approximately 600 mPa·s or less. The viscosity of the surface coating composition is measured using a B-type viscometer at a rotational speed of 60 rpm by selecting an appropriate spindle.

The surface layer can be formed by coating the substrate with the surface coating composition using knife coating, bar coating, blade coating, doctor coating, roll coating, cast coating, and the like and, as necessary, leaving to stand at room temperature or heating at approximately 80° C. to 150° C. as necessary, and drying and/or curing. The surface layer may also be subjected to surface finishing such as emboss finishing.

The thickness of the surface layer may be, for example, approximately 3 µm or greater, approximately 5 µm or greater, or approximately 10 µm or greater, but approximately 50 µm or less, approximately 30 µm or less, or approximately 20 µm or less. In the present disclosure, the thickness of the surface layer refers to the thickness of the thickest portion, i.e., the maximum thickness.

In some embodiments, the surface layer is transparent or semi-transparent. In these embodiments, the total light transmittance in the wavelength range of 400 to 700 nm of the surface layer may be approximately 80% or greater, approximately 85% or greater, or approximately 90% or greater. In these embodiments, decorations, such as printing, provided on the substrate can be visually observed through the surface layer.

The film may further contain a stretchable substrate layer as a substrate. As the stretchable substrate layer, at least one type of resin layer selected from the group consisting of polyvinyl chloride, polyurethane, polyethylene, polypropylene, vinyl chloride-vinyl acetate resins, acrylic resins, cellulose resins, and fluororesins can be used.

The stretchable substrate layer may be colored or colorless. The stretchable substrate layer may be opaque, semi-transparent, or transparent. The stretchable substrate layer may have a substantially smooth surface and may have a structured surface that can be formed by surface processing, such as embossing. By configuring the appearance or the shape of the stretchable substrate layer as described above, various decorative characteristics can be imparted to the film.

In an embodiment, the stretchable substrate layer contains a transparent polyvinyl chloride resin layer and a colored polyvinyl chloride resin layer. In the film of this embodiment, the colored polyvinyl chloride resin layer is supported or protected by the transparent polyvinyl chloride resin layer, and thus durability can be imparted to the decorative characteristics of the film. For example, the film of this embodiment can be suitably used for adhesion to interior materials or exterior materials of buildings or vehicles.

The thickness of the stretchable substrate layer may be, for example, approximately 25 µm or greater, approximately 50 µm or greater, or approximately 80 µm or greater, but approximately 5 mm or less, approximately 1 mm or less, or approximately 0.5 mm or less.

In some embodiments, the tensile elongation ratio of the stretchable substrate layer is approximately 10% or greater, approximately 20% or greater, or approximately 30% or greater, and approximately 400% or less, approximately 350% or less, or approximately 300% or less. The tensile elongation ratio of the stretchable substrate layer is a value calculated by preparing a sample having a width of 25 mm and a length of 150 mm and stretching the sample until the sample is broken using a tensile tester at a temperature of 20° C., a tensile test speed of 300 mm/min, and a grip spacing of 100 mm, using the equation: [grip spacing at the time of breaking (mm)–grip spacing before the stretching (mm) (=100 mm)]/grip spacing before the stretching (mm) (=100 mm)×100(%).

In some embodiments, the glass transition temperature (Tg) of the substrate layer is not lower than approximately 50° C., not lower than approximately 55° C., or not lower than approximately 60° C. and not higher than approximately 80° C., not higher than approximately 75° C., or not higher than approximately 70° C. When a substrate layer having a glass transition temperature within the range described above is used, the embedding of hard particles in the substrate layer is accelerated when a pressing process such as emboss finishing is used, and the shedding of hard particles can thus be suppressed more effectively. The glass transition temperature of the substrate layer can be measured by differential thermal analysis (TDA).

The stretchable substrate layer may have an adhesive layer on the other side of the surface layer. Generally used adhesives such as solvent-type, emulsion-type, pressure-sensitive type, heat-sensitive type, and heat-curable or ultra-violet-curable type adhesives, including acrylics, polyolefins, polyurethanes, polyesters, rubbers, and the like can be used as the adhesive layer. The thickness of the adhesive layer may be typically approximately 5 µm or greater, approximately 10 µm or greater, or approximately 20 µm or greater, but approximately 100 µm or less, approximately 80 µm or less, or approximately 50 µm or less.

The surface of the adhesive layer may be provided with a liner. Examples of the liner include papers; plastic materials, such as polyethylene, polypropylene, polyester, and cellulose acetate; and papers coated with such plastic materials. These liners may have surfaces that have been subjected to release treatment using silicone or the like. The thickness of the liner is typically approximately 5 µm or greater, approximately 15 µm or greater, or approximately 25 µm or greater, but approximately 500 µm or less, approximately 300 µm or less, or approximately 250 µm or less.

In one embodiment, the gloss of the surface layer is not greater than approximately 5.5 GU when the measurement angle is set to 60 degrees. In some embodiments, the surface gloss of the film is not greater than approximately 5 GU or not greater than approximately 4 GU at 60 degrees.

In one embodiment, the gloss of the surface layer is not greater than approximately 0.6 GU at 20 degrees, not greater than approximately 5.5 GU at 60 degrees, and not greater than approximately 7 GU at 85 degrees. In some embodiments, the surface gloss of the film is not greater than approximately 0.5 GU at 20 degrees, not greater than approximately 5 GU at 60 degrees, and not greater than approximately 6 GU at 85 degrees or not greater than approximately 0.3 GU at 20 degrees, not greater than approximately 4 GU at 60 degrees, and not greater than approximately 5 GU at 85 degrees. When the surface gloss of the film is a combination of the ranges described above, the reflection of incident light from various angles on the film can be suppressed, and the decoration of the film can be recognized from a wide range of viewing angles.

In some embodiments, the lightness $L^*$ of the film is not greater than approximately 27, not greater than approximately 26.5, or not greater than approximately 26 when measured using a spectrophotometer with a light source D65/10°, specular reflection treatment SCI, and UV reflection 0%.

In some embodiments, when the lightness of the film before stretching is $L^*_1$, the lightness after 150% stretching is $L^*_2$, and the difference of lightness is $\Delta L^* = L^*_2 - L^*_1$, the difference of lightness $\Delta L^*$ is approximately 5.5 or less, approximately 5 or less, or approximately 4 or less. In this embodiment, whitening of the film when the film is stretched can be suppressed. Therefore, when the film is applied to the surface by bending or stretching, the decorative characteristics of the film can be maintained at the bent portion or stretched portion.

The use of the film of the present disclosure is not particularly limited. For example, the film of the present disclosure can be used as interior materials such as walls, stairs, ceilings, pillars, and partitions, or exterior materials such as outer walls, of buildings, such as buildings, apartments, or houses. Furthermore, the stretchable film can be also used as interior or exterior of various transportation vehicles such as railway vehicles, vessels, aircrafts, automobiles including two-wheeled vehicles, and four-wheeled vehicles. Furthermore, the stretchable film can be also used as covering materials for various articles, such as traffic signs, signboards, furniture, and electrical appliances. The film of the present disclosure can be suitably used for adhesion to interior materials or exterior materials of buildings or vehicles.

EXAMPLES

In the following examples, specific embodiments of the present disclosure are described as examples, but the present disclosure is not limited to these embodiments. All "parts" and "percent" are based on mass unless specified otherwise. The numerical values essentially include errors derived from the measurement principles and measuring devices. The numerical values are generally indicated by significant FIGURES that have been rounded.

Materials and reagents used in the present examples are shown in Table 1.

TABLE 1

| Name or abbreviation | Description | Supplier |
|---|---|---|
| Art pearl C-1000 | Urethane resin beads, average particle diameter: 3 µm | Negami Chemical Industrial Co., Ltd. (Nomi-shi, Ishikawa, Japan) |
| Art pearl CE-800T | Urethane resin beads, average particle diameter: 6 µm | Negami Chemical Industrial Co., Ltd. (Nomi-shi, Ishikawa, Japan) |
| Art pearl CE-400T | Urethane resin beads, average particle diameter: 15 µm | Negami Chemical Industrial Co., Ltd. (Nomi-shi, Ishikawa, Japan) |
| Art pearl C-300 | Urethane resin beads, average particle diameter: 22 µm | Negami Chemical Industrial Co., Ltd. (Nomi-shi, Ishikawa, Japan) |
| Art pearl C-200 | Urethane resin beads, average particle diameter: 32 µm | Negami Chemical Industrial Co., Ltd. (Nomi-shi, Ishikawa, Japan) |

TABLE 1-continued

| Name or abbreviation | Description | Supplier |
|---|---|---|
| Art pearl G-800 | Acrylic resin beads, average particle diameter: 6 μm | Negami Chemical Industrial Co., Ltd. (Nomi-shi, Ishikawa, Japan) |
| ALUNABEADS (trade name) CB-A09S | Alumina spherical particles, average particle diameter: 9 μm, modified Mohs hardness: 11 | Showa Denko K.K. (Minato-ku, Tokyo, Japan) |
| ALUNABEADS (trade name) CB-A20S | Alumina spherical particles, average particle diameter: 20 μm, modified Mohs hardness: 11 | Showa Denko K.K. (Minato-ku, Tokyo, Japan) |
| ALUNABEADS (trade name) CB-A30S | Alumina spherical particles, average particle diameter: 30 μm, modified Mohs hardness: 11 | Showa Denko K.K. (Minato-ku, Tokyo, Japan) |
| ALUNABEADS (trade name) CB-P40 | Alumina spherical particles, average particle diameter: 40 μm, modified Mohs hardness: 11 | Showa Denko K.K. (Minato-ku, Tokyo, Japan) |
| ALUNABEADS (trade name) CB-A50S | Alumina spherical particles, average particle diameter: 50 μm, modified Mohs hardness: 11 | Showa Denko K.K. (Minato-ku, Tokyo, Japan) |
| MIBK ST L | Nanosilica particles, average particle diameter: 40 to 50 nm, 30 mass % 4-methyl-2-pentanone (MIBK) dispersion liquid | Nissan Chemical Industries, Ltd. (Chiyoda-ku, Tokyo, Japan) |
| T5652 | Polycarbonate diol, OH value: 51 to 61 mgKOH/g, viscosity: 7000 to 16000 mPa · s (50° C.) | Asahi Kasei Corporation (Chiyoda-ku, Tokyo, Japan) |
| MCPV-12 | Hydroxy group-containing polyurethane, 30 mass % methyl ethyl ketone solution, 2500 mPa · s (25° C.) | Tosoh Corporation (Minato-ku, Tokyo, Japan) |
| CAB-381-20 | Cellulose acetate butyrate | Eastman Chemical Company (Kingsport, Tennessee, United States) |
| SILCLEAN 3700 | Hydroxy group-containing silicone-modified polymer | BYK Japan KK (Shinjuku-ku, Tokyo, Japan) |
| MEGAFACE F563 | Fluorine group-containing/hydrophilic group-containing oligomer | DIC Corporation (Itabashi-ku, Tokyo, Japan) |
| D131N | Xylylene diisocyanate | Mitsui Chemicals, Inc. (Minato-ku, Tokyo, Japan) |
| CORONATE HX | Hexamethylene diisocyanate | Tosoh Corporation (Minato-ku, Tokyo, Japan) |
| MPA | 1-Methoxy-2-propyl acetate, solvent | Sigma-Aldrich Co. LLC (Saint Louis, Missouri, United States) |
| MIBK | 4-Methyl-2-pentanone, solvent | Wako Pure Chemical Industries, Ltd. (Chuo-ku, Osaka, Japan) |

Transparent Resin Substrate Layer

To a polyvinyl chloride film having a thickness of 80 μm, a polyethylene terephthalate (PET) film was heat-laminated in advance to obtain a transparent resin substrate layer. The composition of the polyvinyl chloride film was polyvinyl chloride/ester plasticizer/organic stabilizer (acrylic resin, zinc stearate, and the like)=72/16/12 (mass ratio). The PET film was Teijin (trade name) Tetoron (trade name) Film G2 (available from Teijin Film Solutions Limited, Chiyoda-ku, Tokyo, Japan) having a thickness of 50 μm.

Example 1

A surface coating composition was obtained by agitating a mixture having the composition shown in Table 2, containing urethane resin beads, alumina spherical particles, nanosilica particles, and a binder resin, for 3.5 minutes using a Planetary Centrifugal Mixer THINKY AR-250 (available from Thinky Corporation, Chiyoda-ku, Tokyo, Japan). A polyvinyl chloride film of a transparent resin substrate layer was coated with the surface coating composition so that the gap was 60 μm using a knife coater. The coated film was dried and heat-cured in an oven at a temperature of 65° C. for 2 minutes and in an oven at a temperature of 120° C. for 5 minutes to form a surface layer having a dry thickness of approximately 30 μm. The PET film was separated from the transparent resin substrate layer, laminated with a polyvinyl chloride film including a surface layer and a black polyvinyl chloride film (polyvinyl chloride/ester plasticizer/organic stabilizer, pigment and the like (acrylic resin, zinc stearate, carbon black, and the like)=72/16/12 (mass ratio)) having a thickness of 80 μm, and pressed using a heat processing roll under conditions at a line speed of 7 m/min, a nip pressure of 0.2 MPa, and a temperature at 60° C. to obtain a film.

Examples 2 to 4

Films were obtained by preparing a surface coating composition in the same manner as in Example 1 with the exception that the mass ratio of the urethane resin beads and the alumina spherical particles was modified as shown in Table 2 without any change to the total content of urethane resin beads and alumina spherical particles.

Examples 5 to 7

Films were obtained by preparing a surface coating composition in the same manner as in Example 1 with the exception that the mass ratio of the urethane resin beads and the alumina spherical particles with respect to the binder was modified as shown in Table 2 without any modification to the mass ratio of the urethane resin beads and the alumina spherical particles.

Examples 8 to 10

Films were obtained by preparing a surface coating composition in the same manner as in Example 1 with the exception that the average particle diameter of the alumina spherical particles was modified.

Examples 11 to 13

Films were obtained by preparing a surface coating composition in the same manner as in Example 1 with the exception that the average particle diameter of the urethane resin beads was modified.

Examples 14 to 16

Films were obtained by preparing a surface coating composition in the same manner as in Example 1 while modifying the mass ratio of the nanosilica particles with respect to the binder and the corresponding mass ratio of the urethane resin beads and the alumina spherical particles with respect to the binder as shown in Table 2.

Comparative Example 1

A film was obtained by preparing a surface coating composition in the same manner as in Example 1 with the formula shown in Table 2 without using urethane resin beads.

Comparative Example 2

A film was obtained by preparing a surface coating composition in the same manner as in Example 1 with the formula shown in Table 2 without using alumina spherical particles.

Comparative Examples 3 and 4

Films were obtained by preparing a surface coating composition in the same manner as in Example 1 with the exception that the mass ratio of the urethane resin beads and the alumina spherical particles with respect to the binder was modified as shown in Table 2 without any modification to the mass ratio of the urethane resin beads and the alumina spherical particles.

Comparative Example 5

A film was obtained by preparing a surface coating composition in the same manner as in Example 1 with the exception that the average particle diameter of the alumina spherical particles was modified.

Comparative Example 6

A film was obtained by preparing a surface coating composition in the same manner as in Example 1 with the exception that the average particle diameter of the urethane resin beads was modified.

Comparative Example 7

A film was obtained by preparing a surface coating composition in the same manner as in Example 1 with the exception that the urethane resin beads were changed to acrylic resin beads.

Comparative Example 8

A film was obtained by preparing a surface coating composition in the same manner as in Example 1 with the formula shown in Table 2 without using nanosilica particles.

Comparative Example 9

A Film was obtained by preparing a surface coating composition in the same manner as in Example 1 while modifying the mass ratio of the nanosilica particles with respect to the binder and the corresponding mass ratio of the urethane resin beads and the alumina spherical particles with respect to the binder as shown in Table 2.

Comparative Example 10

A film was obtained by preparing a surface coating composition in the same manner as in Example 1 with the formula shown in Table 2 without using urethane resin beads or nanosilica particles.

TABLE 2-1

Table 2

| | Example 1 | Example 2 | Example 3 | Example 4 | Example 5 | Example 6 | Example 7 | Example 8 | Example 9 |
|---|---|---|---|---|---|---|---|---|---|
| C-1000 | — | — | — | — | — | — | — | — | — |
| CE-800T | 3.77 | 1.89 | 7.54 | 11.31 | 4.56 | 5.37 | 6.19 | 3.77 | 3.77 |
| CE-400T | — | — | — | — | — | — | — | — | — |
| C-300 | — | — | — | — | — | — | — | — | — |
| C-200 | — | — | — | — | — | — | — | — | — |
| G-800 | — | — | — | — | — | — | — | — | — |
| CB-A09S | — | — | — | — | — | — | — | 15.08 | — |
| CB-A20S | — | — | — | — | — | — | — | — | 15.08 |
| CB-A30S | 15.08 | 16.97 | 11.31 | 7.54 | 18.25 | 21.48 | 24.76 | — | — |
| CB-P40 | — | — | — | — | — | — | — | — | — |
| CB-A50S | — | — | — | — | — | — | — | — | — |
| MIBKSTL | 18.85 | 18.85 | 18.85 | 18.85 | 15.21 | 11.51 | 7.74 | 18.85 | 18.85 |
| T5652 | 10.56 | 10.56 | 10.56 | 10.56 | 8.52 | 6.44 | 4.33 | 10.56 | 10.56 |
| MCPV-12 | — | — | — | — | — | — | — | — | — |
| CAB-381-20 | 2.64 | 2.64 | 2.64 | 2.64 | 2.13 | 1.61 | 1.08 | 2.64 | 2.64 |
| SILCLEAN3700 | 1.51 | 1.51 | 1.51 | 1.51 | 1.52 | 1.53 | 1.55 | 1.51 | 1.51 |
| MEGAFACEF563 | — | — | — | — | — | — | — | — | — |
| D131N | 4.22 | 4.22 | 4.22 | 4.22 | 3.41 | 2.58 | 1.73 | 4.22 | 4.22 |
| CORONATEHX | — | — | — | — | — | — | — | — | — |
| MPA | 43.36 | 43.36 | 43.36 | 43.36 | 46.39 | 49.48 | 52.62 | 43.36 | 43.36 |
| MIBK | — | — | — | — | — | — | — | — | — |
| Urethane resin beads/hard particles | 20/80 | 10/90 | 40/60 | 60/40 | 20/80 | 20/80 | 20/80 | 20/80 | 20/80 |
| Nanosilica particles/binder × 100 | 43 | 43 | 43 | 43 | 43 | 43 | 43 | 43 | 43 |
| Urethane resin beads/binder × 100 | 29 | 14 | 57 | 86 | 43 | 67 | 114 | 29 | 29 |
| Hard particles/binder × 100 | 114 | 129 | 86 | 57 | 171 | 267 | 457 | 114 | 114 |

TABLE 2-2

(Continuation of Table 2)

| | Example 10 | Example 11 | Example 12 | Example 13 | Example 14 | Example 15 | Example 16 | Comparative Example 1 | Comparative Example 2 |
|---|---|---|---|---|---|---|---|---|---|
| C-1000 | — | 3.77 | — | — | — | — | — | — | — |
| CE-800T | 3.77 | — | — | — | 3.79 | 3.84 | 3.89 | — | 18.85 |
| CE-400T | — | — | 3.77 | — | — | — | — | — | — |
| C-300 | — | — | — | 3.77 | — | — | — | — | — |
| C-200 | — | — | — | — | — | — | — | — | — |
| G-800 | — | — | — | — | — | — | — | — | — |
| CB-A09S | — | — | — | — | — | — | — | — | — |
| CB-A20S | — | — | — | — | — | — | — | — | — |
| CB-A30S | — | 15.08 | 15.08 | 15.08 | 15.17 | 15.36 | 15.55 | 18.85 | — |
| CB-P40 | 15.08 | — | — | — | — | — | — | — | — |
| CB-A50S | — | — | — | — | — | — | — | — | — |
| MIBK ST L | 18.85 | 18.85 | 18.85 | 18.85 | 25.29 | 38.40 | 51.84 | 18.85 | 18.85 |
| T5652 | 10.56 | 10.56 | 10.56 | 10.56 | 9.10 | 6.14 | 3.11 | 10.56 | 10.56 |
| MCPV-12 | — | — | — | — | — | — | — | — | — |
| CAB-381-20 | 2.64 | 2.64 | 2.64 | 2.64 | 2.28 | 1.54 | 0.78 | 2.64 | 2.64 |
| SILCLEAN 3700 | 1.51 | 1.51 | 1.51 | 1.51 | 1.52 | 1.54 | 1.56 | 1.51 | 1.51 |
| MEGAFACEF563 | — | — | — | — | — | — | — | — | — |
| D131N | 4.22 | 4.22 | 4.22 | 4.22 | 3.64 | 2.46 | 1.24 | 4.22 | 4.22 |
| CORONATE HX | — | — | — | — | — | — | — | — | — |
| MPA | 43.36 | 43.36 | 43.36 | 43.36 | 39.20 | 30.72 | 22.03 | 43.36 | 43.36 |
| MIBK | — | — | — | — | — | — | — | — | — |
| Urethane resin beads/hard particles | 20/80 | 20/80 | 20/80 | 20/80 | 20/80 | 20/80 | 20/80 | 0/100 | 100/0 |
| Nanosilica particles/binder × 100 | 43 | 43 | 43 | 43 | 67 | 150 | 400 | 43 | 43 |
| Urethane resin beads/binder × 100 | 29 | 29 | 29 | 29 | 33 | 50 | 100 | 0 | 143 |
| Hard particles/binder × 100 | 114 | 114 | 114 | 114 | 133 | 200 | 400 | 143 | 0 |

TABLE 2-3

(Continuation of Table 2)

| | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|
| C-1000 | — | — | — | — | — | — | — | — |
| CE-800T | 1.47 | 2.22 | 3.77 | — | — | 4.00 | 3.75 | — |
| CE-400T | — | — | — | — | — | — | — | — |
| C-300 | — | — | — | — | — | — | — | — |
| C-200 | — | — | — | 3.77 | — | — | — | — |
| G-800 | — | — | — | — | 3.77 | — | — | — |
| CB-A09S | — | — | — | — | — | — | — | — |
| CB-A20S | — | — | — | — | — | — | — | — |
| CB-A30S | 5.88 | 8.90 | — | 15.08 | 15.08 | 15.99 | 14.99 | 12.71 |
| CB-P40 | — | — | — | — | — | — | — | — |
| CB-A50S | — | — | 15.08 | — | — | — | — | — |
| MIBK ST L | 29.42 | 25.96 | 18.85 | 18.85 | 18.85 | — | 12.49 | — |
| T5652 | 16.48 | 14.54 | 10.56 | 10.56 | 10.56 | 11.19 | 11.99 | — |
| MCPV-12 | — | — | — | — | — | — | — | 50.22 |
| CAB-381-20 | 4.12 | 3.63 | 2.64 | 2.64 | 2.64 | 2.80 | 3.00 | — |
| SILCLEAN 3700 | 1.47 | 1.48 | 1.51 | 1.51 | 1.51 | 1.60 | 1.50 | — |
| MEGAFACEF563 | — | — | — | — | — | — | — | 0.37 |
| D131N | 6.59 | 5.81 | 4.22 | 4.22 | 4.22 | 4.48 | 4.80 | — |
| CORONATE HX | — | — | — | — | — | — | — | 3.59 |
| MPA | 34.57 | 37.45 | 43.36 | 43.36 | 43.36 | 59.95 | 47.48 | — |
| MIBK | — | — | — | — | — | — | — | 33.11 |
| Urethane resin beads[1]/ hard particles | 20/80 | 20/80 | 20/80 | 20/80 | 20/80 | 20/80 | 20/80 | 0/100 |
| Nanosilica particles/ binder × 100 | 43 | 43 | 43 | 43 | 43 | 0 | 25 | 0 |
| Urethane resin beads[1]/binder × 100 | 7 | 12 | 29 | 29 | 29 | 29 | 25 | 0 |
| Hard particles/ binder × 100 | 29 | 49 | 114 | 114 | 114 | 114 | 100 | 84 |

1) In only Comparative Example 7, the ratio of acrylic resin beads to hard particles or a binder is shown.

Gloss

The gloss of the surface layer was measured at the measurement angles of 20°/60°/85° using a portable glossmeter BYK-Gardner micro-TRI-gloss (available from BYK Japan KK, Shinjuku-ku, Tokyo, Japan). When the gloss at 60° was 5.5 GU or less, the sample was evaluated as satisfying practical low gloss requirements. Furthermore, when the three conditions of having a gloss of 0.6 GU or less at a measurement angle of 20°, 5.5 GU or less at 60°, and 6.5 GU or less at 85° were satisfied, the sample was evaluated as having an excellent low gloss surface appearance.

Surface Color Measurement

The lightness L* values were measured using a spectrophotometer CM-3700d (available from Konica Minolta Japan, Inc., Minato-ku, Tokyo, Japan) with a light source D65/10°, specular reflection treatment SCI, and UV reflection 0%. When the lightness L* value was 27 or less, the surface was evaluated as having low gloss and excellent lightness.

Lightness L* after 150% Stretching

Samples that were cut to 150 mm×15 mm in advance were fixed to a chuck at both ends at positions 25 mm from the ends and, for a measurement length of 100 mm, subjected to 150% stretching using a Tensilon Universal Material Testing Instrument RTC-1210A (available from A&D Company, Limited, Toshima-ku, Tokyo, Japan) at a rate of 100 mm/min in an environment at a temperature of 20° C. and a relative humidity of 60%. Surface colors of the samples after the stretching were measured. The difference of lightness ΔL* was calculated, where the lightness of the film before stretching is $L^*_1$, the lightness after 150% stretching is $L^*_2$, and the difference of lightness $\Delta L^* = L^*_2 - L^*_1$. When the difference of lightness ΔL* was 5.5 or less, the loss in low gloss (whitening) due to stretching was evaluated as being small.

Scratch Resistance

Scratch resistance was evaluated under conditions at a load of 1.7 kg and a pencil hardness of 9 H using a pencil hardness tester in accordance with JIS K5600-5-4:1999. Cases in which damage due to the cohesive failure of the surface layer was observed at a rate of 50% or less, excluding the initial region (length: 10 mm), after the film surface was scratched were evaluated as good, and cases in which such damage was observed at a rate of 50% or greater were evaluated as poor.

The evaluation results of the films of Examples 1 to 16 and Comparative Examples 1 to 11 are shown in Table 3.

TABLE 3

| | Surface gloss (GU) | | | | | | Scratch |
|---|---|---|---|---|---|---|---|
| | 20° | 60° | 85° | $L^*_1$ | $L^*_2$ | ΔL* | resistance |
| Example 1 | 0.5 | 4.8 | 4.6 | 26.6 | 29.5 | 2.9 | Good |
| Example 2 | 0.6 | 5.4 | 5.9 | 26.9 | 30.1 | 3.3 | Good |
| Example 3 | 0.3 | 3.4 | 3.9 | 26.1 | 28.6 | 2.4 | Good |
| Example 4 | 0.2 | 2.3 | 3.2 | 25.6 | 27.9 | 2.3 | Good |
| Example 5 | 0.2 | 2.3 | 2.2 | 26.6 | 31.1 | 4.5 | Good |
| Example 6 | 0.1 | 1.1 | 1.4 | 25.7 | 30.9 | 5.2 | Good |
| Example 7 | 0.1 | 0.5 | 1.3 | 24.4 | 31.4 | 7.0 | Good |
| Example 8 | 0.5 | 5.1 | 7.7 | 27.0 | 34.4 | 7.4 | Good |
| Example 9 | 0.5 | 5.2 | 5.3 | 26.1 | 29.3 | 3.2 | Good |
| Example 10 | 0.5 | 5.3 | 6.6 | 26.6 | 30.0 | 3.5 | Good |
| Example 11 | 0.4 | 4.4 | 4.2 | 26.8 | 30.4 | 3.5 | Good |
| Example 12 | 0.6 | 4.6 | 3.4 | 26.5 | 30.3 | 3.8 | Good |
| Example 13 | 0.5 | 5.2 | 3.0 | 26.0 | 29.2 | 3.2 | Good |
| Example 14 | 0.4 | 3.5 | 4.3 | 26.0 | 29.3 | 3.3 | Good |
| Example 15 | 0.1 | 2.0 | 2.5 | 24.6 | 29.9 | 5.3 | Good |

TABLE 3-continued

| | Surface gloss (GU) | | | $L^*_1$ | $L^*_2$ | $\Delta L^*$ | Scratch resistance |
|---|---|---|---|---|---|---|---|
| | 20° | 60° | 85° | | | | |
| Example 16 | 0.1 | 1.6 | 2.5 | 22.4 | 37.7 | 15.3 | Good |
| Comparative Example 1 | 1.2 | 9.8 | 10.0 | 26.5 | 30.3 | 3.8 | Good |
| Comparative Example 2 | 0.1 | 0.7 | 2.8 | 23.3 | 26.6 | 3.3 | Poor |
| Comparative Example 3 | 2.7 | 19.3 | 26.5 | 25.2 | 26.9 | 1.7 | Poor |
| Comparative Example 4 | 2.0 | 15.1 | 17.3 | 26.0 | 28.7 | 2.7 | Good |
| Comparative Example 5 | 0.6 | 6.0 | 7.9 | 26.3 | 28.9 | 2.6 | Good |
| Comparative Example 6 | 0.7 | 5.9 | 4.3 | 25.8 | 29.4 | 3.6 | Good |
| Comparative Example 7 | 0.8 | 7.3 | 8.2 | 26.4 | 34.8 | 8.4 | Good |
| Comparative Example 8 | 0.9 | 8.3 | 7.0 | 26.6 | 30.6 | 4.0 | Good |
| Comparative Example 9 | 1.1 | 9.2 | 9.2 | 26.1 | 29.5 | 3.4 | Good |
| Comparative Example 10 | 4.8 | 26.7 | 27.0 | 25.5 | 28.2 | 2.7 | Good |

REFERENCE SIGNS LIST

100 Film
10 Surface layer
12 Binder
14 Urethane resin bead
16 Hard particle
18 Nanosilica particle
20 Substrate layer

The invention claimed is:

1. A scratch resistant film comprising a stretchable surface layer, the surface layer comprising:
   a binder comprising a urethane resin;
   urethane resin beads having an average particle diameter of 3 µm to 30 µm;
   hard particles having an average particle diameter of 5 µm to 45 µm, wherein a ratio of the average particle diameter of the hard particles to the average particle diameter of the urethane resin beads is not less than 1.2, wherein the hard particles have a spherical shape; and
   nanosilica particles;
   wherein the surface layer comprises from 30 parts by mass to 500 parts by mass of the hard particles based on 100 parts by mass of the binder; and the gloss of the surface layer is 5.5 GU or less at 60 degrees, wherein the surface layer comprises from 30 parts by mass to 500 parts by mass of the nanosilica particles based on 100 parts by mass of the binder.

2. The scratch resistant film of claim 1, wherein the average particle diameter of the nanosilica particles is from 10 nm to 100 nm.

3. The scratch resistant film of claim 1, wherein the surface layer comprises from 13 parts by mass to 120 parts by mass of the urethane resin beads based on 100 parts by mass of the binder.

4. The scratch resistant film according to claim 1, wherein the hard particles comprise alumina beads.

5. The scratch resistant film according to claim 1, wherein when a lightness of the scratch resistant film before being stretched is defined as $L^*1$, a lightness of the scratch resistant film after being stretched to 150% is defined as $L^*2$, and a difference in lightness $L^*2-L^*1$ is defined as $\Delta L^*$, the difference in lightness $\Delta L^*$ is 5.5 or less.

6. The scratch resistant film according to claim 1, wherein the gloss of the surface layer is 0.6 GU or less at 20 degrees, 5.5 GU or less at 60 degrees, and 7 GU or less at 85 degrees.

7. The scratch resistant film according to claim 1, wherein the binder further comprises a cellulose ester.

8. The scratch resistant film according to claim 1, wherein the urethane resin comprises a cured product of a two-part urethane resin composition.

9. The scratch resistant film according to claim 1, wherein the surface layer further comprises a silicone-modified polymer having a functional group capable of reacting with isocyanates or a hydroxyl group.

10. The scratch resistant film according to claim 1, further comprising a stretchable substrate layer.

11. The scratch resistant film of claim 10, wherein the substrate layer comprises a layer comprising at least one resin selected from the group consisting of polyvinyl chloride, polyurethane, polyethylene, polypropylene, vinyl chloride-vinyl acetate resins, acrylic resins, cellulose resins, and fluorinated resins.

12. The scratch resistant film according to claim 10, wherein the substrate layer comprises a transparent polyvinyl chloride resin layer and a colored polyvinyl chloride resin layer.

13. The scratch resistant film according to claim 1, adapted to be applied to an interior or exterior material of a construction or vehicle.

14. A surface coating composition comprising:
   a binder precursor comprising a urethane resin composition;
   urethane resin beads having an average particle diameter of 3 µm to 30 µm;
   hard particles having an average particle diameter of 5 µm to 45 µm, wherein a ratio of the average particle diameter of the hard particles to the average particle diameter of the urethane resin beads is not less than 1.2, wherein the hard particles have a spherical shape; and
   nanosilica particles,
   wherein the surface coating composition comprises from 30 parts by mass to 500 parts by mass of the hard particles based on 100 parts by mass of the binder precursor, wherein the surface coating composition comprises from 30 parts by mass to 500 parts by mass of the nanosilica particles based on 100 parts by mass of the binder precursor.

15. The surface coating composition according to claim 14, wherein an average particle diameter of the nanosilica particles is from 10 nm to 100 nm.

16. The surface coating composition of claim 14, wherein the surface coating composition comprises from 5 parts by mass to 120 parts by mass of the urethane resin beads based on 100 parts by mass of the binder precursor.

17. The surface coating composition according to claim 14, wherein the hard particles comprise alumina beads.

18. The surface coating composition according to claim 14, wherein the binder precursor further comprises a cellulose ester.

* * * * *